US011119888B2

(12) United States Patent
Kreinin et al.

(10) Patent No.: US 11,119,888 B2
(45) Date of Patent: Sep. 14, 2021

(54) DATA VERIFICATION SYSTEM

(71) Applicant: SS&C Technologies, Inc., Windsor, CT (US)

(72) Inventors: Alexander Kreinin, Toronto (CA); Yijun Jiang, Toronto (CA)

(73) Assignee: SS&C Technologies, Inc., Windsor, CT (US)

( * ) Notice: Subject to any disclaimer, the term of this patent is extended or adjusted under 35 U.S.C. 154(b) by 0 days.

(21) Appl. No.: 16/528,506

(22) Filed: Jul. 31, 2019

(65) Prior Publication Data
US 2021/0034502 A1 Feb. 4, 2021

(51) Int. Cl.
G06F 11/36 (2006.01)
(52) U.S. Cl.
CPC ...... G06F 11/3616 (2013.01); G06F 11/3684 (2013.01); G06F 11/3688 (2013.01); G06F 11/3692 (2013.01)
(58) Field of Classification Search
CPC ............ G06F 11/3616; G06F 11/3684; G06F 11/3688; G06F 11/3692
USPC ........................................................ 717/124
See application file for complete search history.

(56) References Cited

U.S. PATENT DOCUMENTS

| 10,020,038 | B1* | 7/2018 | Nishizaki | G11C 7/18 |
| 2005/0071266 | A1* | 3/2005 | Eder | G06Q 40/00 |
| | | | | 705/38 |
| 2009/0043637 | A1* | 2/2009 | Eder | G06N 7/005 |
| | | | | 705/35 |
| 2014/0053135 | A1* | 2/2014 | Bird | G06F 8/71 |
| | | | | 717/124 |
| 2017/0052880 | A1* | 2/2017 | Rosomoff | G06F 11/3668 |
| 2018/0314619 | A1* | 11/2018 | Jagadeesan | H04L 45/00 |

OTHER PUBLICATIONS

Borodin et al., Handbook of Brownian Motion—Facts and Formulae, 2d ed., Birkhauser (2015), ch. 1:pp. 7-12; ch. 2:pp. 2, 12-31.
Ruiz, XVA Desks—A New Era for Risk Management, Palgrave McMillan (2015), pp. 191-256 and 293-314.

* cited by examiner

Primary Examiner — John Q Chavis
(74) Attorney, Agent, or Firm — Akerman LLP; Stephen C. Glazier

(57) ABSTRACT

Aspects of the disclosure provide for a computer program product comprising a computer readable medium having program instructions embodied therewith, the program instructions executable by a processor to generate a set of scenarios corresponding to a test data set and depending on a selected data analysis model, determine a value for each point in time over a defined time interval and an exposure profile that is a continuous time representation of each value determined for each point in time, determine a risk envelope desired for the scenarios, determine a test statistic defining a fraction of the defined time interval that the exposure profile is outside the risk envelope, determine a cumulative distribution of the test statistic, the cumulative distribution having a critical value corresponding to a defined probability of accuracy of the data analysis model, and validate the data analysis model based on the critical value and the test statistic.

25 Claims, 8 Drawing Sheets

—PRIOR ART—

DATA VERIFICATION SYSTEM

BACKGROUND

The present disclosure relates to the field of data analysis and verification.

Various data models are used to make determinations according to measured, observed, or other sources of data. When accurate, these data models can be beneficial in detecting, predicting, estimating, or otherwise mitigating undesirable consequences stemming from activities represented by the data. Therefore, it is sometimes desirable to validate the data models to ensure proper operation of the analysis performed pursuant to the data models.

SUMMARY

Aspects of the disclosure provide for a computer program product comprising a computer readable storage medium having program instructions embodied therewith. Executing the instructions causes the processor to generate a set of scenarios corresponding to a test data set, the set of scenarios depending on a data analysis model selected to process the test data set. Executing the instructions further causes the processor to, for each scenario of the set of scenarios, determine a value for each point in time over a defined time interval and an exposure profile, where the exposure profile is a continuous time representation of each value determined for each point in time for a given scenario. Executing the instructions further causes the processor to determine a risk envelope defining a maximum risk and a minimum risk desired for the scenarios. Executing the instructions further causes the processor to, for each scenario of the set of scenarios, determine a test statistic defining a fraction of the defined time interval that the exposure profile is outside the risk envelope. Executing the instructions further causes the processor to determine a cumulative distribution of the test statistic, the cumulative distribution having a critical value corresponding to a defined probability of accuracy of the data analysis model and the test statistic. Executing the instructions further causes the processor to validate the data analysis model based on the critical value determined at least partially according to the test statistic.

Other aspects of the disclosure provide for a computer-implemented method. In at least some examples, the method includes determining a test set of data and an analysis risk model for analysis with respect to the test set, calibrating the analysis risk model for a given calibration interval, generating a set of scenarios corresponding to the test set of data, the set of scenarios depending on a data analysis model selected to process the test set of data, determining, for each scenario of the set of scenarios, a value for each point in time over a defined time interval and an exposure profile, where the exposure profile is a continuous time representation of each value determined for each point in time for a given scenario of the set of scenarios, determining a risk envelope defining a maximum risk and a minimum risk desired at each point in time for a given scenario of the set of scenarios, determining, for each scenario of the set of scenarios, a test statistic defining a fraction of the defined time interval that the exposure profile is outside the risk envelope, determining a cumulative distribution of the test statistic, the cumulative distribution having a critical value corresponding to a defined probability of accuracy of the data analysis model and the test statistic, and validating the data analysis model based on the critical value determined at least partially according to the test statistic.

Other aspects of the disclosure provide for a user equipment. In at least some examples, the user equipment includes a processor and a memory storage device coupled to the processor and comprising executable instructions. Executing the executable instructions causes the processor to generate a set of scenarios corresponding to a test data set, the set of scenarios depending on a data analysis model selected to process the test data set, for each scenario of the set of scenarios, determine a value for each point in time over a defined time interval and an exposure profile, where the exposure profile is a continuous time representation of each value determined for each point in time for a given scenario, determine a risk envelope defining a maximum risk and a minimum risk desired at each point in time for a given scenario of the set of scenarios, wherein the risk envelope is defined as a set of $$\{(t, x): L(t) \le x \le U(t), T_0 \le t \le T_b\},$$
$$\mathbb{P}(\varepsilon_t^{(n)} > U(t)) = \alpha, \mathbb{P}(\varepsilon_t^{(n)} < L(t)) = \alpha, \text{ and } \alpha = \frac{1-p}{2},$$

wherein $L(t)$ is a boundary representing the minimum risk, $U(t)$ is a boundary representing the maximum risk, $T_0$ is a beginning of the defined time interval, $T_b$ is an end of the defined time interval, $\varepsilon_t^{(n)}$ is the exposure profile, and $p$ is the defined probability of accuracy, for each scenario of the set of scenarios, determine a test statistic defining a fraction of the defined time interval that the exposure profile is outside the risk envelope, determine a cumulative distribution of the test statistic, the cumulative distribution having a critical value corresponding to a defined probability of accuracy of the data analysis model and the test statistic.

Other aspects of the disclosure provide for a computer-implemented method. In at least some examples, the method includes performing data analysis of a portfolio based on a data analysis model to determine exposure associated with the portfolio, determining an expected exposure of the portfolio, where the expected exposure is a probability-weighted average exposure of the portfolio at a future date, determining an effective expected exposure based on the expected exposure, where the effective expected exposure is a maximum value selected from an expected exposure at a current point in time and expected exposure for a previous point in time within a defined time interval, determining an effective expected positive exposure based on the effective expected exposure, wherein the effective expected positive exposure is an average of the effective expected exposure over the defined time interval, determining an excess exposure based on the effective expected positive exposure, determining a time average of the excess exposure with respect to the effective expected positive exposure, determining a cumulative distribution of the time average of the excess exposure, and determining a critical value with respect to a second probability of the cumulative distribution of the time average of the excess exposure, wherein the critical value with respect to the second probability is a capital buffer associated with the excess exposure of the portfolio.

Other aspects of the disclosure provide for a computer-implemented method. In at least some examples, the method includes validating a risk analysis model by generating a set of scenarios corresponding to a test set of data, the set of scenarios depending on a data analysis model selected to process the test set of data, determining, for each scenario of the set of scenarios, a value for each point in time over a defined time interval and an exposure profile, where the exposure profile is a continuous time representation of each value determined for each point in time for a given scenario of the set of scenarios, determining a risk envelope defining a maximum risk and a minimum risk desired at each point in time for a given scenario of the set of scenarios, determining, for each scenario of the set of scenarios, a test statistic defining a fraction of the defined time interval that the exposure profile is outside the risk envelope, determining a cumulative distribution of the test statistic, the cumulative distribution having a critical value corresponding to a defined probability of accuracy of the data analysis model and the test statistic, and validating the data analysis model based on the critical value determined at least partially according to the test statistic. The method further includes modeling exposure of a profile using the validated risk analysis model, determining a compensation for the modeled exposure, and taking action responsive to modeling the exposure or determining the compensation.

DETAILED DESCRIPTION

Disclosed herein are embodiments that provide for objective verification of a data model according to historical data spanning a defined period of time. In some examples, the data model is a future predictive model (e.g., used and/or implemented to predict a future condition or value). In at least some examples, the verification is referred to as back testing. Some back testing implementations are applied to risk analysis models that seek to objectively quantify a risk associated with a certain set of conditions or inputs. The back testing implementations are also, in some examples, applied to financial considerations, such as back testing financial portfolio exposure models that are used in modeling and/or predicting financial portfolio exposure or risk. For example, when a model for predicting future activities is created, back testing may be performed to validate the model. The back testing tests the model against historical data spanning a period of time, in some examples substantially large (such as in a range of years, decades, etc.) and in other examples approximately one year, to validate whether the model accurately predicts or models behavior of data based on a current state or value and the historical data, and therefore is deemed valid for predicting a future state or value. Based on this determination of validity, the model is used, in some examples, to model and/or predict risk associated with a set of inputs (e.g., financial risk, physical risk, risk of damage or destruction, risk of an event occurring, etc.) and, in yet other examples, an action is taken based on results of the model or prediction. For example, in some implementations a decision is made, an interaction with a user, consumer or other party is approved or denied, or a modification is performed based on the results of the model.

Figure 1:
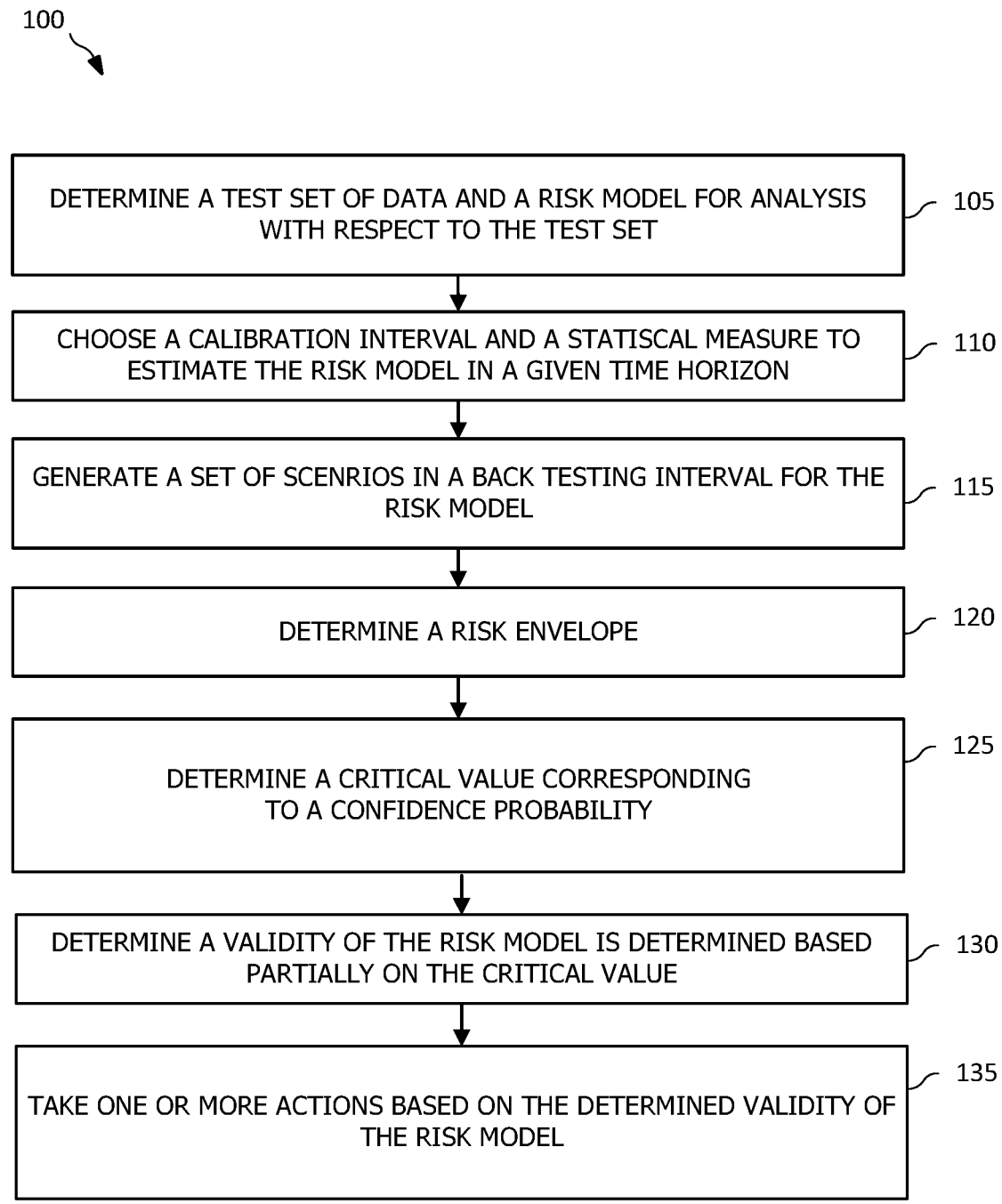
FIG. 1 is a flowchart of an illustrative method in accordance with various embodiments.

Turning now to FIG. 1, a flowchart of an illustrative method 100 is shown. In at least some examples, the method 100 is a method of validating a risk analysis model, such as to validate whether the risk analysis model produces an output that accurately corresponds to and/or is consistent with known historical data. The method 100 is implemented by a computing system, either centralized or distributed (e.g., such as a cloud computing environment) that is in some examples capable of cognitive, quantum, or other advanced processing.

At operation 105, a test set of data is determined and a risk model for analysis with respect to the test set is determined. The test set of data is, in some examples, data representative of typical values of a data type of the test set. For example, if the method 100 is validating a risk analysis model with respect to analyzing the risk associated with data from a sensor, the test set includes data typical of sensor output of the sensor. The risk model chosen can be any risk model suitable for analysis with respect to the test set and the validity of which is to be tested, determined, and/or certified.

At operation 110, a calibration interval is chosen and a statistical measure is chosen to estimate the risk model in a given time horizon. The calibration interval is, in some examples, an observation interval during which input data is collected to determine operating parameters of the risk model (e.g., such as the parameters that determine and/or define the behavior and dynamics of the risk model). The input data is, for example, vector-valued time series of historical observations of risk factors such as, when considering a financial application of the method 100) stock indices, FX rates, interest rates, credit spreads, etc. The statistical measure is any non-deterministic variable that provides data of interest in the risk model and is referred to later herein as a test statistic or a $\tau$ statistic. Subsequently, the parameters of the risk model are calibrated to determine a procedure and operation of the risk model. The calibration is performed according to any suitable means known to statistical computation, the scope of which is not limited herein. At operation 115, a set of scenarios is generated in a back testing interval for the risk model. The set of scenarios are a set of random processes or outcomes, given the test set of data, which are generated by the risk model to represent a plurality of possible outcomes over the back testing interval. In some examples, a large number of scenarios are generated, such as hundreds, thousands, tens of thousands, hundreds of thousands, or more. The back testing interval is, in some examples, about one year in length and is denoted as $[T_0, T_b]$. After generating the scenarios, for each generated scenario a value $V_t$ and an exposure profile $\varepsilon_t$ (e.g., such that $\varepsilon_t = \max(0, V_t)$) are determined, where t is within the back testing interval such that $t \in [T_0, T_b]$.

At operation 120, a risk envelope is determined. The risk envelope is defined by bounds U(t) and L(t), where L(t)<U(t). The risk envelope defines a maximum and minimum risk that is desired for the test set and/or the scenarios. For example, if the test data is temperatures, U(t) defines a maximum desired temperature and U(t) defines a minimum desired temperature. At operation 125, a critical value x*(p*) is determined corresponding to the confidence probability p*. The critical value is, for example, a quantile corresponding to p* of a cumulative distribution of a τ statistic. The confidence probability p* is a user defined value that represents a desired significance level for the risk model (e.g., frequency of desired accuracy). For example, if a user desires for the risk model to be deemed valid when it is accurate 95 percent of the time, p* would be chosen as 0.95. To determine the critical value, first the τ statistic is determined. The τ statistic defines the share (e.g., fraction) or amount of time that the test set is outside of the risk envelope (e.g., at a given time t, a value of the test set is greater than U(t) or less than L(t)). The cumulative distribution is determined based on the τ statistic, where the cumulative distribution is defined as $F_\tau(x) = \mathbb{P}(\tau(\varepsilon_t) \leq x)$, (0<x<1).

At operation 130, a determination of the validity of the risk model is determined based partially on the critical value x*(p*). To determine the validity of the risk model, a new τ statistic is determined for a set of historical data, where the new τ statistic for the set of historical data is now noted as a τ* statistic and determined in substantially a same manner as described above with respect to operation 115, operation 120, and operation 125. Next, a comparison is performed between τ* and x*(p*) to determine the validity of the risk model, where the risk model is valid when τ*≤x*(p*) and the risk model is invalid and, in some examples, should be discarded or unused when τ*>x*(p*). At operation 135, one or more actions are taken based on the determined validity of the risk model. For example, responsive to determining that the risk model is valid, the risk model may be used to analyze a data set and perform one or more actions responsive to the analysis (e.g., for practical applications such as performing a recalibration of a software system or hardware device, accepting or rejecting a proposal or offer, engaging in a transaction or business venture, or any other suitable action that may be taken responsive to a result of a risk analysis).

While the operations of the method 100 have been discussed and labeled with numerical reference, in various examples the method 100 includes additional operations that are not recited herein, in some examples any one or more of the operations recited herein include one or more sub-operations (e.g., such as intermediary comparisons, computations, calculations, determinations, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of the present disclosure.

Figure 2:
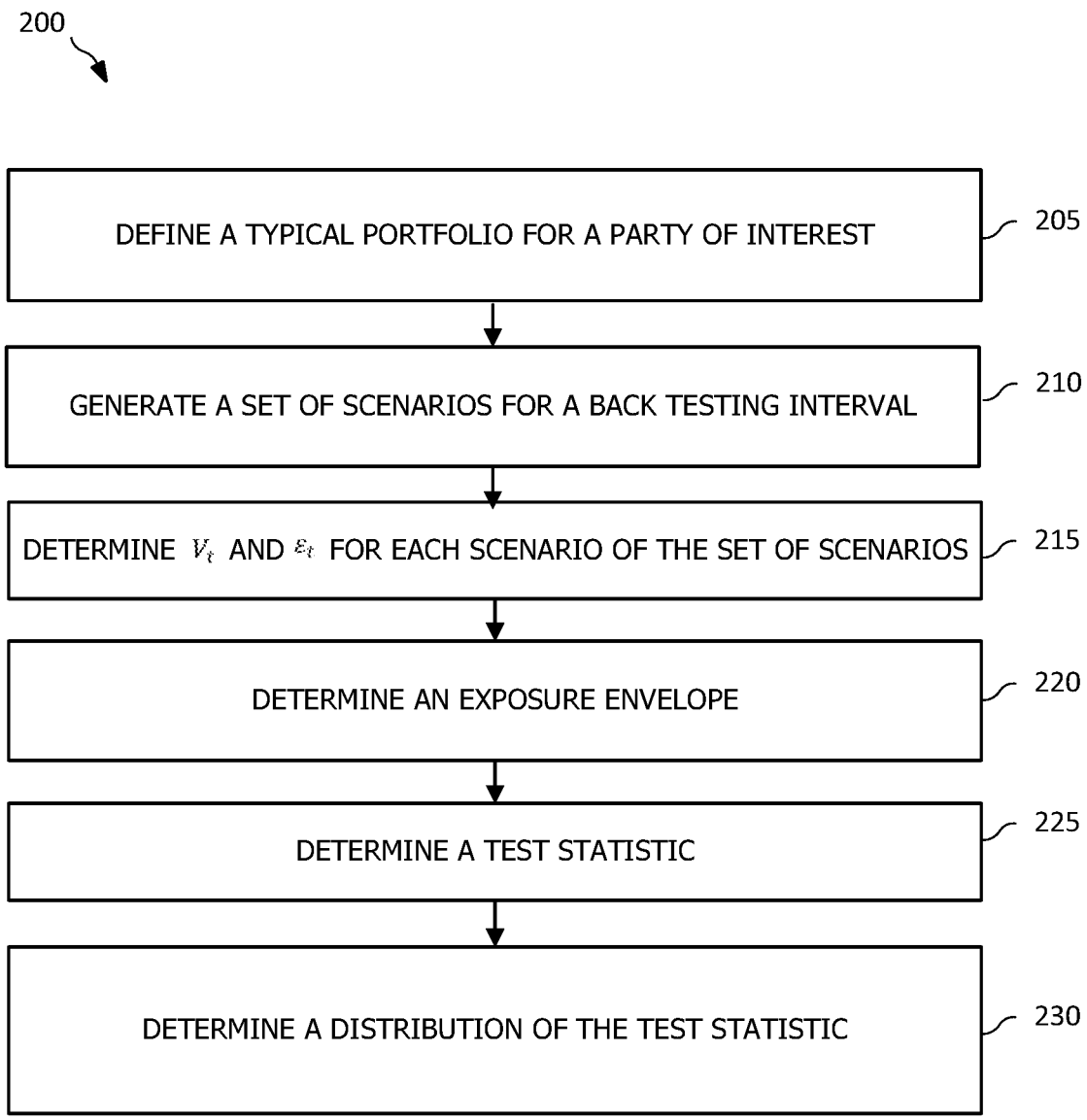
FIG. 2 is a flowchart of an illustrative method in accordance with various embodiments.

Turning now to FIG. 2, a flowchart of an illustrative method 200 is shown. In at least some examples, the method 200 is a method of back testing of portfolio exposure. For example, the method 200 is an exemplary implementation of the teachings of the present disclosure with respect to financial considerations, such as analysis of financial portfolio exposure risk models to determine validity of those models. The method 200 is implemented by a computing system, either centralized or distributed (e.g., such as a cloud computing environment) that is in some examples capable of cognitive, quantum, or other advanced processing.

At operation 205, a typical portfolio is defined for a party of interest. At operation 210, a set N of scenarios $S=(\varepsilon_t^{(n)})$, (n=1, 2, . . . , N), $T_0 \leq t \leq T_b$ is generated for a back testing interval $[T_0, T_b]$. The set of scenarios include a plurality of possible outcomes for the portfolio over $[T_0, T_b]$, including gains in value, losses in value, and or value remaining substantially steady or the same. The set of scenarios are generated randomly, according to historical data, or according to any other suitable method, the scope of which is not limited herein. In at least some examples, is assumed that an exposure risk factor model under test for verification according to the method 200 is calibrated such that calibration is not included in the method 200. If the model is not calibrated, in at least some examples the method 200 further includes calibration of the model after operation 205 and before operation 210, where the calibration is performed according to any suitable and/or industry-accepted method, the scope of which is not limited herein.

At operation 215, $V_t$ and $\varepsilon_t$ are determined for each scenario of the set of scenarios. In at least some examples, $\varepsilon_t$ is a continuous representation of $V_t$ with respect to t. At operation 220, an exposure envelope is determined. In at least some examples, the exposure envelope is determined according to the bounds U(t) and L(t). In at least some examples, the exposure envelope is defined as $\{(t,x): L(t) \leq x \leq U(t), T_0 \leq t \leq T_b\}$. U(t) and L(t) are in turn defined according to $\mathbb{P}(\varepsilon_t^{(n)} > U(t)) = \alpha$ and $\mathbb{P}(\varepsilon_t^{(n)} < L(t)) = \alpha$, wherein $$\alpha = \frac{1-p}{2}.$$

Figure 3A:
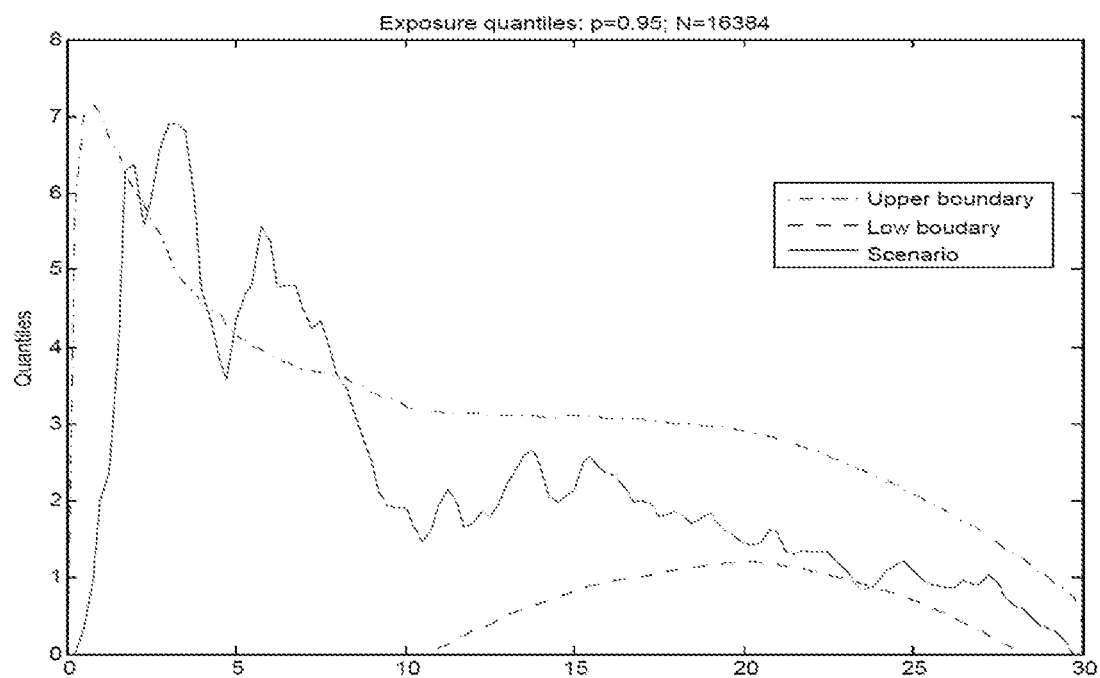
FIG. 3A is an illustrative graph in accordance with various embodiments.

Thus, according to the above relations, U(t) and L(t) are determined for each t, $T_0 \leq t \leq T_b$ to determine and define the exposure envelope. An illustrative U(t), L(t), and $\varepsilon_t$ are shown in FIG. 3A for one scenario of the set N for ease of understanding.

At operation 225, a τ (test) statistic is determined. The τ statistic is, in some examples, referred to as a test statistic. To determine the τ statistic, first an indicator is determined. The indicator is defined as $\psi_\varepsilon(t) = \mathbb{I}(\varepsilon_t < L(t)) + \mathbb{I}(\varepsilon_t > U(t))$ such that $\psi_\varepsilon(t) = 1$ when $\varepsilon_t$ is outside of the exposure envelope (e.g., greater than U(t) or less than L(t)). Next, $\psi_\varepsilon(t)$ is integrated to determine $\tau_\varepsilon(t)$, or the τ statistic for $\varepsilon_t$ at a given time t, $T_0 \leq t \leq T_b$. The integration is defined as $$\tau_\varepsilon(T) = \frac{1}{T} \int_{T_0}^{T_b} \psi_\varepsilon(t) dt,$$

$T = T_b - T_0$. Thus, after performing the integration, $\tau_\varepsilon$ represents a fraction of time$[T_0, T_b]$ in which $\varepsilon_t$ is greater than U(t) or less than L(t). In the above integration to determine $\tau_\varepsilon$, it is assumed that $T_0 = 0$ and $T_b = T$ to simplify notation. In at least some examples, the calculation of $\tau_\varepsilon$ may be simplified when L(t)=0. In such a circumstance, $\psi_\varepsilon(t) = \mathbb{I}(\varepsilon_t > U(t))$ and the subsequent integration remains the same.

Figure 3B:
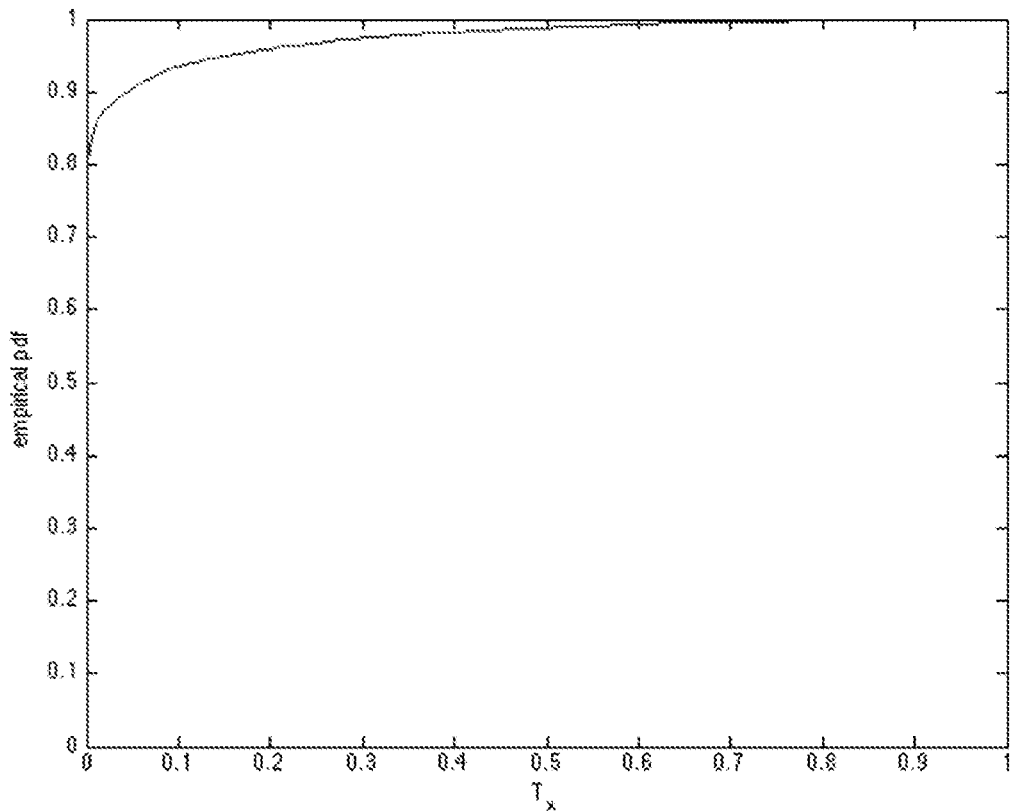
FIG. 3B is an illustrative graph in accordance with various embodiments.

At operation 230, a distribution of $\tau_\varepsilon$ is determined. The distribution of $\tau_\varepsilon$ is determined, in some examples, by performing Monte Carlo sampling, where the Monte Carlo sampling is a random sampling. In contrast to other back testing methodologies that do not determine and utilize an exposure envelope with U(t) and L(t) that are generally non-linear, and in which a distribution of the τ statistic could be known, the distribution of $\tau_\varepsilon$ determined according to the method 200 is unknown. As such, the Monte Carlo sampling, or another accepted and/or suitable random sampling method, determines a distribution of $\tau_\varepsilon$ in the present of non-linear U(t) and L(t). Subsequent to determining the distribution of $\tau_\varepsilon$, a critical value of the distribution is determined and τ* is determined according to historical data by performing steps substantially the same as operations 210 through 225. Based on the critical value determined at operation 230 and τ*, a determination is made as to whether an analysis model undergoing back testing according to the method 200 is valid, where the analysis model is valid when τ* is less than the critical value determined at operation 230. An illustrative distribution of $\tau_\varepsilon$ is shown in FIG. 3B. Both FIG. 3A and FIG. 3B illustrate principles of the method 200 with respect to an illustrative portfolio containing an interest rate swap on a swap notional of $100 having a payment frequency of 0.25 and a maturity of 30 years. A par swap rate, noted as k, for the illustrations of FIGS. 3A and 3B is 0.0357, p=0.95, $D_c$=0.17, $D_b$=0.54, and τ*=0.07.

While the operations of the method 200 have been discussed and labeled with numerical reference, in various examples the method 200 includes additional operations that are not recited herein, in some examples any one or more of the operations recited herein include one or more sub-operations (e.g., such as intermediary comparisons, computations, calculations, determinations, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of the present disclosure.

Figure 4:
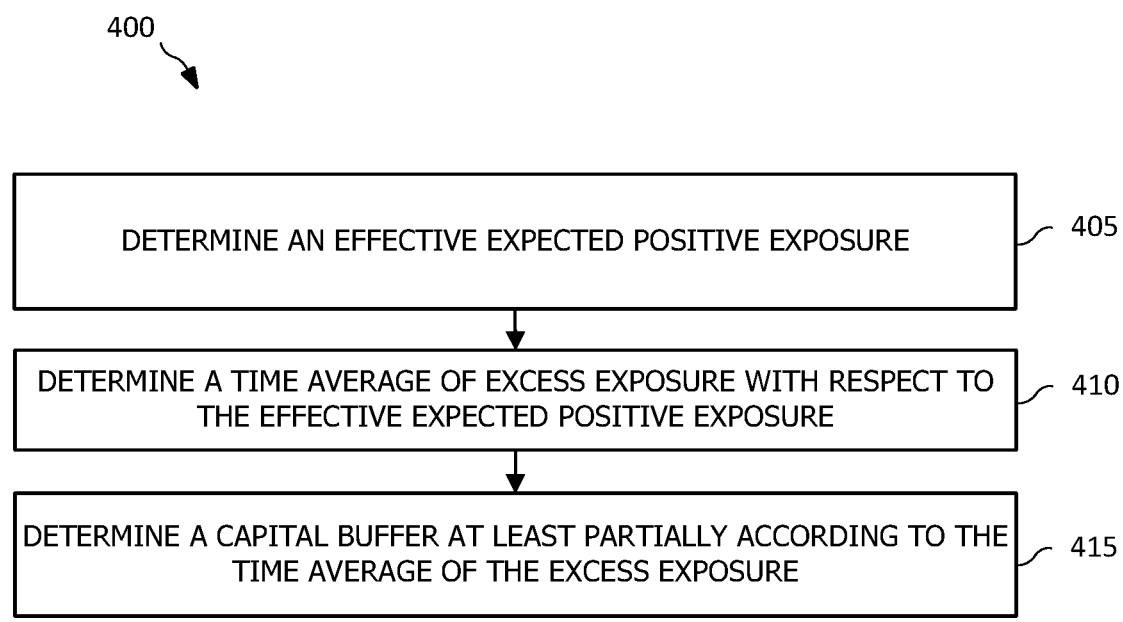
FIG. 4 is a flowchart of an illustrative method in accordance with various embodiments.

Turning now to FIG. 4, a flowchart of an illustrative method 400 is shown. In at least some examples, the method 400 is a method of determining a capital buffer. For example, in at least some implementations the method 400 and the method 200 are complementary such that the method 400 determines a capital buffer for an exposure determined according to a model validated according to the method 200, where at least some values, variable, or other aspects are shared between the method 200 and the method 400. In other examples, the method 400 is capable of implementation independent of the method 200 such that the method 400 may be implemented without implementing the method 200 and vice versa. The method 400 is implemented by a computing system, either centralized or distributed (e.g., such as a cloud computing environment) that is in some examples capable of cognitive, quantum, or other advanced processing.

A capital buffer is an amount of capital that a financial institution is required to hold in addition to other requirements for minimum or specified amounts of capital. At least one factor considered in determining a value of a required capital buffer is the institution's exposure, or the risk of the institution, if a counterparty to a transaction with the institution fully defaults on their obligations with respect to the transaction. Various models exist to determine exposure of an institution generally, or with respect to an individual customer or counterparty to a transaction, and a back testing method for validating the accuracy of at least some of the methods is discussed herein, such as with respect to FIG. 2. After a model has been validated as being acceptably accurate, that model can then be used to determine expected exposure at a given point in time. In this way, the method 200 and the method 400 can operate in a complementary manner, as discussed above, to provide a complete exposure back testing framework with capital buffer determination.

At operation 405, an effective expected positive exposure is determined. The effective expected positive exposure is a time-weighted average of effective expected exposures. In at least some examples, the effective expected positive exposure is determined according to $$M^* = \frac{1}{T}\int_0^T \hat{M}_t dt,$$

where $\hat{M}_t = \max_{s \leq t} M_s$ and $M_s = \mathbb{E}[\varepsilon_t]$, t>0. The effective expected positive exposure, in at least some examples, represents a contribution of a counterparty's portfolio to a systematic risk of the institution. At operation 410, a time average of excess exposure with respect to M* is determined. The time average of the excess exposure is determined according to $$S_T = \frac{1}{T}\int_0^T \varepsilon_t^+ dt,$$

where $\varepsilon_t^+ = \max(0, \varepsilon_t - M^*)$. The excess exposure is, in some examples, the exposure that exceeds an institution's capital on hand, necessitating the need for the capital buffer determined according to the method 400.

At operation 415, the capital buffer is determined at least partially according to $S_T$. To determine the capital buffer according to $S_T$, a cumulative distribution of $S_T$ is first determined. In at least some examples, the cumulative distribution is determined in a manner substantially similar to that discussed above with respect to the method 200, for example, such as by Monte Carlo sampling of $S_T$ to determine the cumulative distribution. The cumulative distribution is defined as $F_s(x) = \mathbb{P}(S_T \leq x)$. Subsequently, given a probability p*, the capital buffer is determined as a critical level s(p*) according to $F_s(s(p^*)) = p^*$, calculated for one year (e.g., T=1). Thus, at an end of operation 415 s(p*) has a value determined to compensate for the EE such that the institution may maintain capital complying with minimum capital requirements based on the determined s(p*).

In at least some examples, a more conservative approach to at least some of the determinations of the method 400 may be desired and/or greater flexibility in selecting p, p*, and/or defining M*. Accordingly, a first suitable alternative for determining M*, which is a more conservative approach that the determination described above with respect to operation 405, is $$\tilde{M}^* = \frac{1}{T}\int_0^T \mathbb{E}[\max_{s \leq t} \varepsilon_s],$$

dt. Yet other suitable alternatives for determining M* are $$\hat{M}^* = \frac{1}{T}\int_0^T \mathbb{E}[\varepsilon_t],$$

dt and $\hat{M}^* = \max_{s \leq t} \mathbb{E}[\varepsilon_s]$.

While the operations of the method 400 have been discussed and labeled with numerical reference, in various examples the method 400 includes additional operations that are not recited herein, in some examples any one or more of the operations recited herein include one or more sub-operations (e.g., such as intermediary comparisons, computations, calculations, determinations, etc.), in some examples any one or more of the operations recited herein is omitted, and/or in some examples any one or more of the operations recited herein is performed in an order other than that presented herein (e.g., in a reverse order, substantially simultaneously, overlapping, etc.), all of which is intended to fall within the scope of the present disclosure.

Figure 5:
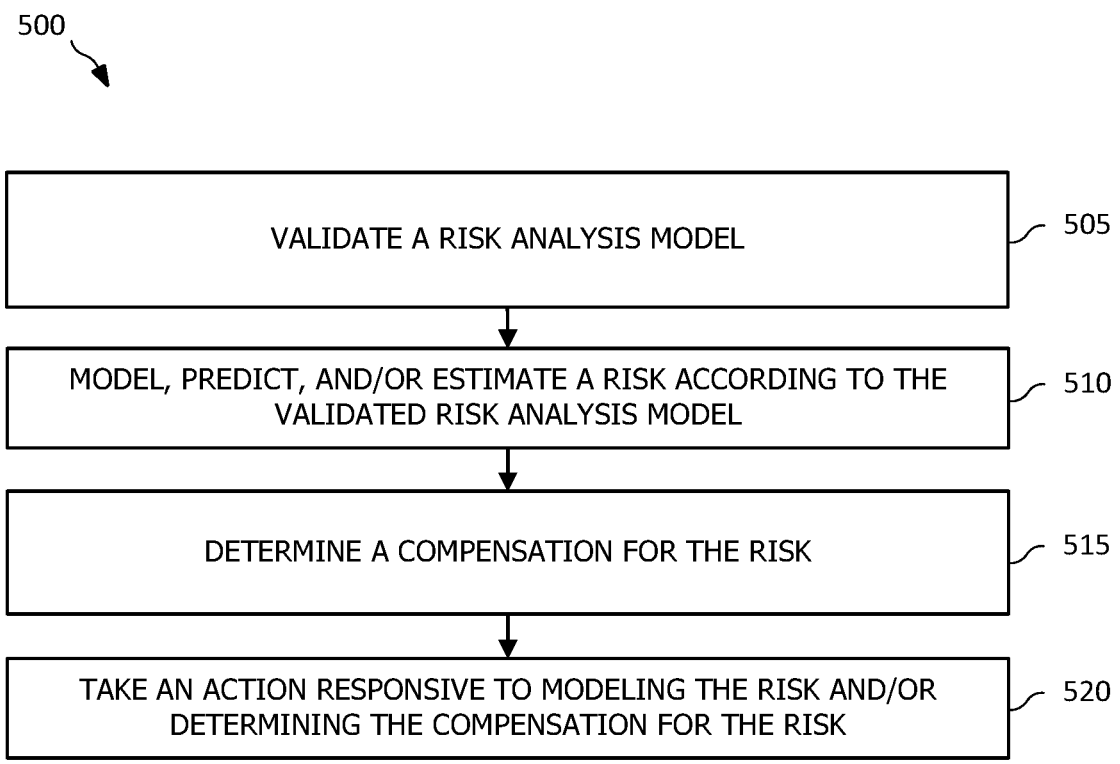
FIG. 5 is a flowchart of an illustrative method in accordance with various embodiments.

Turning now to FIG. 5, a flowchart of an illustrative method 500 is shown. In at least some examples, the method 500 is an exposure back testing framework. The method 500, in at least some examples, combines at least a portion of the method 200 and the method 400 to create and/or provide for the exposure back testing framework. The method 500 is implemented by a computing system, either centralized or distributed (e.g., such as a cloud computing environment) that is in some examples capable of cognitive, quantum, or other advanced processing.

At operation 505, a risk analysis model is validated. The risk analysis model is validated, in some examples, by back testing the risk analysis model. For example, in at least some implementations the risk analysis model is a portfolio exposure model and the back testing validates an accuracy of the portfolio exposure model based at least partially on historical data. At least some implementations of the risk analysis model validation include creation of a risk envelope and a determination of a $\tau$ statistic quantifying an amount of time over a given time period of concern that a data set has a value outside of the risk envelope. Accordingly, in at least some examples, the operation 505 is performed substantially similar to the method 100 of FIG. 1 and/or the method 200 of FIG. 2, as discussed elsewhere herein.

At operation 510, a risk is modeled, predicted, and/or estimated according to the risk analysis model validated at operation 505. For example, exposure for a counterparty portfolio is estimated based on the validated risk analysis model. The risk is, in some examples, expected exposure.

At operation 515, a compensation for the risk is determined. The compensation for the risk, in some examples, is a determination of an adjustment to one or more settings, business parameters, or other characteristics. At least some implementations of the compensation determination include determining a capital buffer, where the capital buffer is determined as a value suitable for compensating for the risk determined at operation 510. Accordingly, in at least some examples, the operation 505 is performed substantially similar to the method 100 of FIG. 1 and/or the method 200 of FIG. 2, as discussed elsewhere herein.

At operation 520, an action is taken responsive to modeling the risk and/or determining the compensation for the risk. The action may take any suitable form, including approving or denying a request, requesting further data input, obtaining additional capital in any form, modifying operating parameters, modifying environment conditions, modifying a product design, or any other action suitable for performance responsive to modeling the risk and/or determining the compensation.

In at least some examples, the operation 515 may be omitted from the method 500 and the operation 520 performed after the operation 510. In yet other examples, operations 505 and 510 may be omitted such that the method 500 begins at operation 515 determining a compensation for an identified or known risk.

Figure 6:
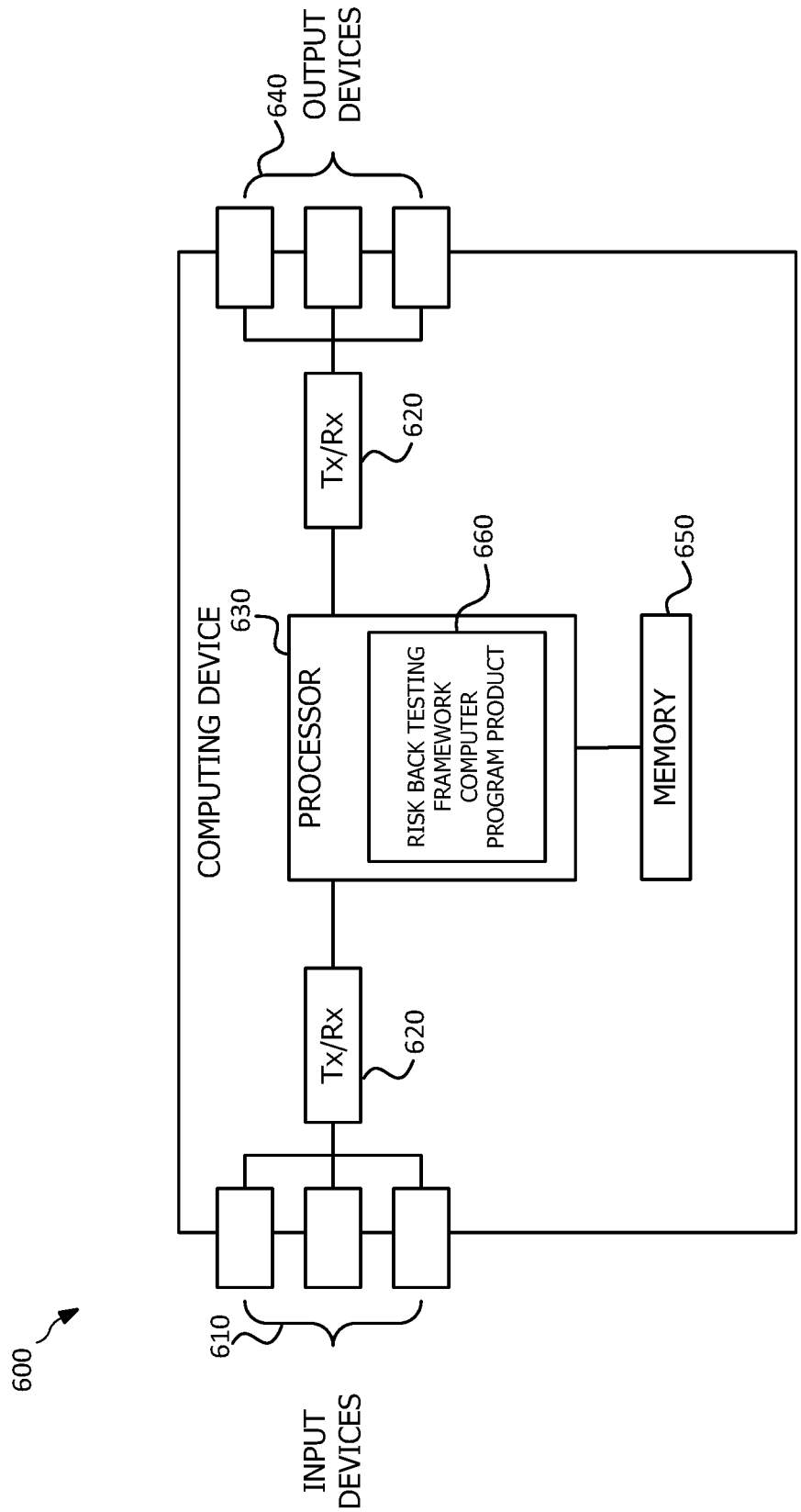
FIG. 6 is a block diagram of a computing device in accordance with various embodiments.

Referring now to FIG. 6, a block diagram of a computing device 600 according to various embodiments is shown. Computing device 600 is any suitable processing device capable of performing the functions disclosed herein such as a processing device, a user equipment, an environmental control device, an Internet of Things (IoT) device, a computer system, a server, a computing resource, a cloud-computing node, a cognitive computing system, etc. Computing device 600 is configured to implement at least some of the features/methods disclosed herein, for example, the risk back testing framework, such as described above with respect to method 100, method 200, method 400, and/or method 500. In various embodiments, for instance, the features/methods of this disclosure are implemented using hardware, firmware, and/or software (e.g., such as software modules) installed to run on hardware. In some embodiments, the software utilizes one or more software development kits (SDKs) or SDK functions to perform at least some of the features/methods of this disclosure.

In some examples, the computing device 600 is an all-in-one device that performs each of the aforementioned operations of the present disclosure, or the computing device 600 is a node that performs any one or more, or portion of one or more, of the aforementioned operations. In one embodiment, the computing device 600 is an apparatus and/or system configured to validate a risk analysis model, model a risk, determine a compensation for a risk, (collectively referred to as implementing a risk back testing framework) and/or perform an action responsive to the foregoing, as described with respect to method 100, method 200, method 400, and/or method 500, for example, according to a computer program product executed on, or by, at least one processor.

The computing device 600 comprises one or more input devices 610. Some of the input devices 610 include at least some of cameras, magnetic sensors, temperature sensors, pressure sensors, accelerometers, microphones, keyboards, touchscreens, buttons, toggle switches, and/or other devices that allow a user to interact with, and/or provide input actively or passively to, the computing device 600. Some other of the input devices 610 are downstream ports coupled to a transceiver (Tx/Rx) 620, which are transmitters, receivers, or combinations thereof. The Tx/Rx 620 transmits and/or receives data to and/or from other computing or electronic devices via at least some of the input devices 610. Similarly, the computing device 600 comprises a plurality of output devices 640. Some of the output devices 640 include at least some of speakers, a display screen (which, in some examples, is also an input device such as a touchscreen), lights, or any other device that allows a user to interact with, and receive output from, the computing device 600. At least some of the output devices 640 are upstream ports coupled to another Tx/Rx 620, wherein the Tx/Rx 620 transmits and/or receives data from other nodes via the upstream ports. The downstream ports and/or the upstream ports include electrical and/or optical transmitting and/or receiving components. In another embodiment, the computing device 600 comprises one or more antennas (not shown) coupled to the Tx/Rx 620. The Tx/Rx 620 transmits and/or receives data from other computing or storage devices wirelessly via the one or more antennas. In yet other embodiments, the computing device 600 includes additional Tx/Rx 620 such that the computing device 600 has multiple networking or communication interfaces, for example, such that the computing device 600 communicates with a first device using a first communication interface (e.g., such as via the Internet) and communicates with a second device using a second communication interface (e.g., such as another computing device 600 without using the Internet).

A processor 630 is coupled to the Tx/Rx 620 and at least some of the input devices 610 and/or output devices 640 and is configured to implement the risk back testing framework. In an embodiment, the processor 630 comprises one or more multi-core processors and/or memory modules 650, which functions as data stores, buffers, etc. The processor 630 is implemented as a general processor or as part of one or more application specific integrated circuits (ASICs), field-programmable gate arrays (FPGAs), and/or digital signal processors (DSPs). Although illustrated as a single processor, the processor 630 is not so limited and alternatively comprises multiple processors. The processor 630 further comprises processing logic configured to execute a risk back testing framework computer program product 660 that is configured to implement the risk back testing framework as described above with respect to method 100, method 200, method 400, and/or method 500.

FIG. 6 also illustrates that a memory module 650 is coupled to the processor 630 and is a non-transitory medium configured to store various types of data. Memory module 650 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 650 houses the instructions for carrying out the various embodiments described herein. For example, the memory module 650 comprises the risk back testing framework computer program product 660, which is executed by processor 630.

It is understood that by programming and/or loading executable instructions onto the computing device 600, at least one of the processor 630 and/or the memory module 650 are changed, transforming the computing device 600 in part into a particular machine or apparatus, for example, an data verification system for implementing a risk back testing framework having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change is preferred to be implemented in software, because re-spinning a hardware implementation is more expensive than re-spinning a software design. Generally, a design that is stable and will be produced in large volume is preferred to be implemented in hardware (e.g., in an ASIC) because for large production runs the hardware implementation is less expensive than software implementations. Often a design is developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions is a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language, and functional programming languages such as Haskell or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
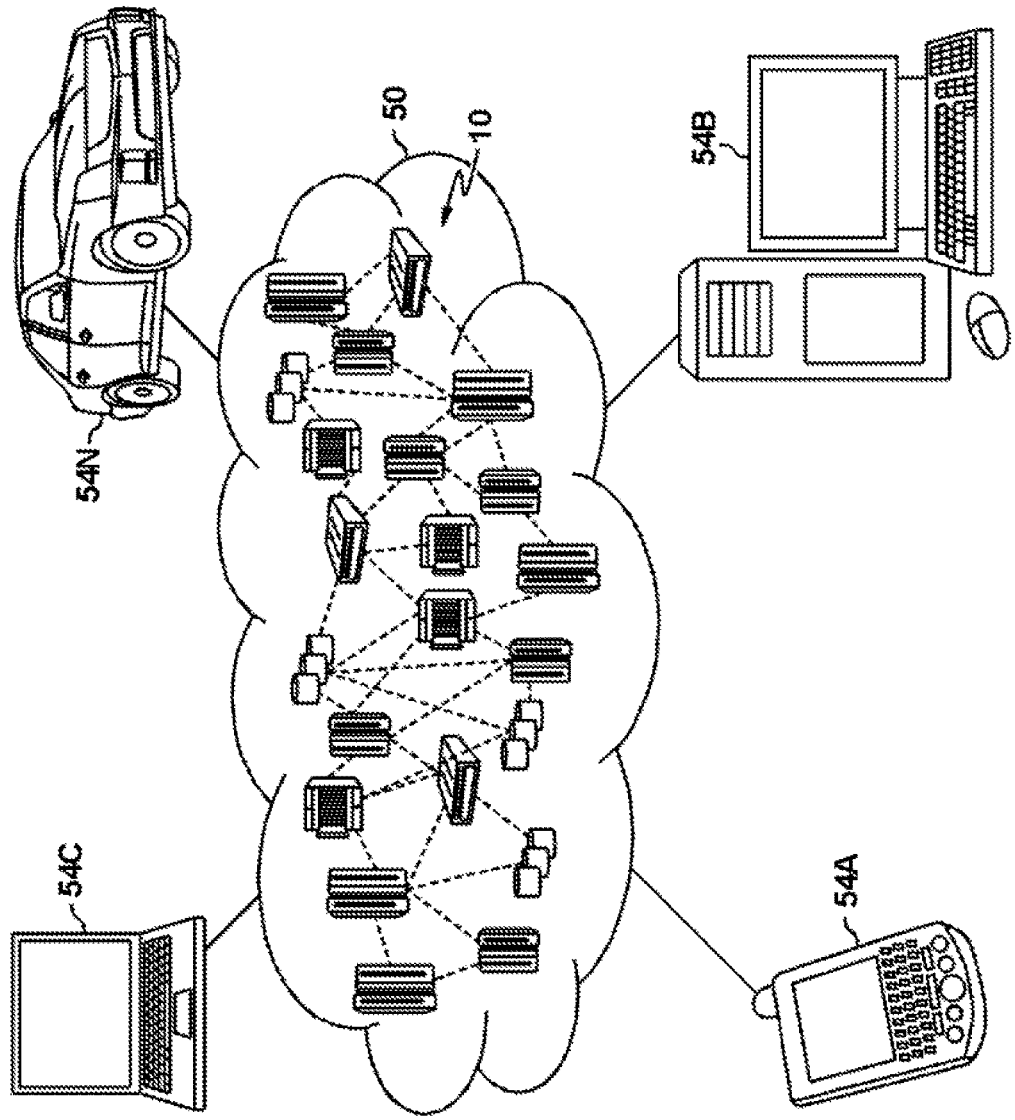
FIG. 7 is a diagram of a cloud-computing environment according to various embodiments.
Figure 8:
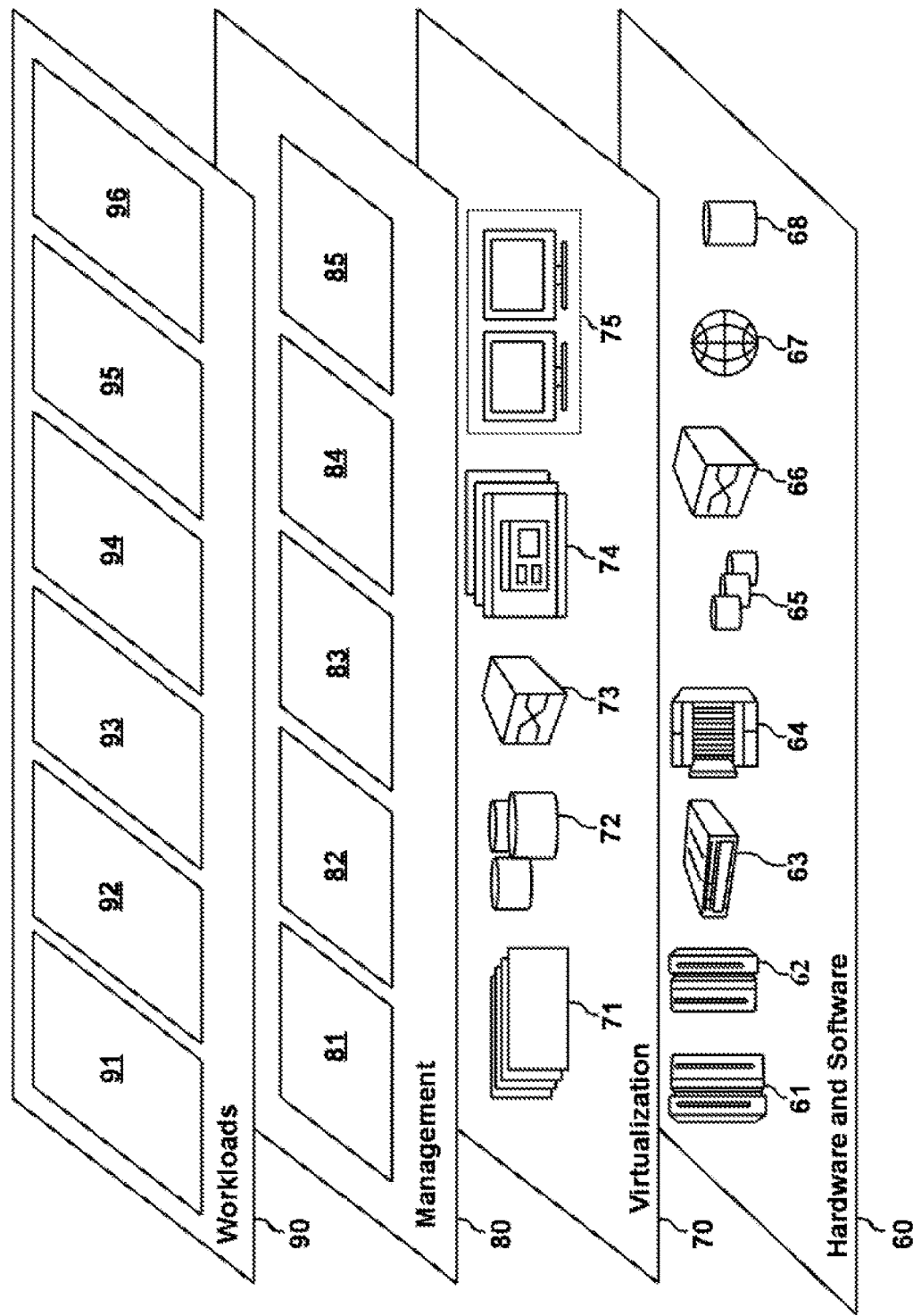
FIG. 8 is a diagram of abstraction model layers according to various embodiments.

Turning now to FIG. 7 and FIG. 8, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that cloud computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the risk bask testing framework described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtualization layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and risk back testing framework 96. These workloads and functions of workloads layer 90 may be end-user applications that enable a subscriber to cloud computing environment 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing environment 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections.

Unless otherwise stated, "about," "approximately," or "substantially" preceding a value means+/−10 percent of the stated value or reference.

What is claimed is:

1. A computer program product comprising a computer readable storage medium having program instructions embodied therewith, the program instructions executable by a processor to:
  generate a set of scenarios corresponding to a test data set, the set of scenarios depending on a data analysis model selected to process the test data set;
  for each scenario of the set of scenarios, determine a value for each point in time over a defined time interval and an exposure profile, where the exposure profile is a continuous time representation of each value determined for each point in time for a given scenario;
  determine a risk envelope defining a maximum risk and a minimum risk desired for the scenarios;
  for each scenario of the set of scenarios, determine a test statistic defining a fraction of the defined time interval that the exposure profile is outside the risk envelope;
  determine a cumulative distribution of the test statistic, the cumulative distribution having a critical value corresponding to a defined probability of accuracy of the data analysis model and the test statistic; and
  validate the data analysis model based on the critical value determined at least partially according to the test statistic.

2. The computer program product of claim 1, wherein validating the data analysis model based on the critical value determined at least partially according to the test statistic comprises:
  determining a second test statistic corresponding to a historical data set; and
  comparing the second test statistic to the critical value, wherein the data analysis model is valid when the second test statistic is not greater than the critical value.

3. The computer program product of claim 1, wherein the risk envelope is defined as a set of $\{(t,x): L(t) \le x \le U(t), T_0 \le t \le T_b\}$, where $\mathbb{P}(\varepsilon_t^{(n)} > U(t)) = \alpha$, $\mathbb{P}(\varepsilon_t^{(n)} < L(t)) = \alpha$, and $$\alpha = \frac{1-p}{2},$$

wherein $L(t)$ is a boundary representing the minimum risk, $U(t)$ is a boundary representing the maximum risk, $T_0$ is a beginning of the defined time interval, $T_b$ is an end of the defined time interval, $\varepsilon_t^{(n)}$ is the exposure profile, and $p$ is the defined probability of accuracy.

4. The computer program product of claim 3, wherein the test statistic is defined as $$\tau_\varepsilon(T) = \frac{1}{T} \int_{T_0}^{T_b} \psi_\varepsilon(t) dt,$$

$T = T_b - T_0$, and wherein $\psi_\varepsilon(t) = \mathbb{1}(\varepsilon_t < L(t)) + \mathbb{1}(\varepsilon_t > U(t))$.

5. The computer program product of claim 4, wherein the cumulative distribution is defined as $F_\tau(x) = \mathbb{P}(\tau(\varepsilon_t) \le x)$, $(0 < x < 1)$ and the critical value is $x$.

6. A computer-implemented method, comprising:
  determining a test set of data and an analysis risk model for analysis with respect to the test set;
  calibrating the analysis risk model for a given calibration interval;

generating a set of scenarios corresponding to the test set of data, the set of scenarios depending on a data analysis model selected to process the test set of data;

determining, for each scenario of the set of scenarios, a value for each point in time over a defined time interval and an exposure profile, where the exposure profile is a continuous time representation of each value determined for each point in time for a given scenario of the set of scenarios;

determining a risk envelope defining a maximum risk and a minimum risk desired at each point in time for a given scenario of the set of scenarios;

determining, for each scenario of the set of scenarios, a test statistic defining a fraction of the defined time interval that the exposure profile is outside the risk envelope;

determining a cumulative distribution of the test statistic, the cumulative distribution having a critical value corresponding to a defined probability of accuracy of the data analysis model and the test statistic; and validating the data analysis model based on the critical value determined at least partially according to the test statistic.

7. The computer-implemented method of claim 6, wherein validating the data analysis model based on the critical value determined at least partially according to the test statistic comprises:

determining a second test statistic corresponding to a historical data set; and comparing the second test statistic to the critical value, wherein the data analysis model is valid when the second test statistic is not greater than the critical value.

8. The computer-implemented method of claim 6, wherein the risk envelope is defined as a set of $\{(t,x): L(t) \leq x \leq U(t), T_0 \leq t \leq T_b\}$, where $\mathbb{P}(\varepsilon_t^{(n)} > U(t)) = \alpha$, $\mathbb{P}(\varepsilon_t^{(n)} < L(t)) = \alpha$, and $$\alpha = \frac{1-p}{2},$$

wherein L(t) is a boundary representing the minimum risk, U(t) is a boundary representing the maximum risk, $T_0$ is a beginning of the defined time interval, $T_b$ is an end of the defined time interval, $\varepsilon_t^{(n)}$ is the exposure profile, and p is the defined probability of accuracy.

9. The computer-implemented method of claim 8, wherein the test statistic is defined as $$\tau_\varepsilon(T) = \frac{1}{T} \int_{T_0}^{T_b} \psi_\varepsilon(t) dt,$$

$T = T_b - T_0$, and wherein $\psi_\varepsilon(t) = \mathbb{I}(\varepsilon_t < L(t)) + \mathbb{I}(\varepsilon_t > U(t))$.

10. The computer-implemented method of claim 9, wherein the cumulative distribution is defined as $F_\tau(x) = \mathbb{P}(\varepsilon_t \leq x)$, $(0 < x < 1)$ and the critical value is x.

11. A user equipment, comprising:
a processor; and
a memory storage device coupled to the processor and comprising executable instructions configured to cause the processor to:
generate a set of scenarios corresponding to a test data set, the set of scenarios depending on a data analysis model selected to process the test data set;

for each scenario of the set of scenarios, determine a value for each point in time over a defined time interval and an exposure profile, where the exposure profile is a continuous time representation of each value determined for each point in time for a given scenario;

determine a risk envelope defining a maximum risk and a minimum risk desired at each point in time for a given scenario of the set of scenarios, wherein the risk envelope is defined as a set of $\{(t,x): L(t) \leq x \leq U(t), T_0 \leq t \leq T_b\}$, $\mathbb{P}(\varepsilon_t^{(n)} > U(t)) = \alpha$, $\mathbb{P}(\varepsilon_t^{(n)} < L(t)) = \alpha$, and $$\alpha = \frac{1-p}{2},$$

wherein L(t) is a boundary representing the minimum risk, U(t) is a boundary representing the maximum risk, $T_0$ is a beginning of the defined time interval, $T_b$ is an end of the defined time interval, $\varepsilon_t^{(n)}$ is the exposure profile, and p is the defined probability of accuracy;

for each scenario of the set of scenarios, determine a test statistic defining a fraction of the defined time interval that the exposure profile is outside the risk envelope; and determine a cumulative distribution of the test statistic, the cumulative distribution having a critical value corresponding to a defined probability of accuracy of the data analysis model and the test statistic.

12. The user equipment of claim 11, wherein executing the instructions further causes the processor to validate the data analysis model based on the critical value determined at least partially according to the test statistic by:

determining a second test statistic corresponding to a historical data set;

comparing the second test statistic to the critical value; and determining, based on the comparison, whether the data analysis model is valid, wherein the data analysis model is valid when the second test statistic is not greater than the critical value.

13. The user equipment of claim 12, wherein, after determining that the data analysis model is valid, executing the instructions further causes the processor to:

perform analysis of a portfolio using the valid data analysis model to determine an exposure associated with the portfolio; and determine a capital buffer corresponding to the exposure associated with the portfolio by:

determining an expected exposure based on the exposure profile;

determining an effective expected exposure based on the expected exposure;

determining an effective expected positive exposure based on the effective expected exposure;

determining an excess exposure based on the effective expected positive exposure;

determining a time average of the excess exposure with respect to the effective expected positive exposure;

determining a cumulative distribution of the time average of the excess exposure; and;

determining a critical value with respect to a second probability of the cumulative distribution of the time average of the excess exposure, wherein the critical value with respect to the second probability is the capital buffer.

14. The user equipment of claim 11, wherein the test statistic is defined as $$\tau_\varepsilon(T) = \frac{1}{T}\int_{\tau_0}^{T_b} \psi_\varepsilon(t)dt,$$

$T=T_b-T_0$, and wherein $\psi_\varepsilon(t)=\mathbb{I}\ (\varepsilon_t<L(t))+\mathbb{I}\ (\varepsilon_t>U(t))$.

15. The user equipment of claim 11, wherein the cumulative distribution is defined as $F_\tau(x)=\mathbb{P}\ (\tau(\varepsilon_t)\leq x)$, $(0<x<1)$ and the critical value is x.

16. A computer-implemented method, comprising:
performing data analysis of a portfolio based on a data analysis model to determine exposure associated with the portfolio;
determining an expected exposure of the portfolio, where the expected exposure is a probability-weighted average exposure of the portfolio at a future date;
determining an effective expected exposure based on the expected exposure, where the effective expected exposure is a maximum value selected from an expected exposure at a current point in time and expected exposure for a previous point in time within a defined time interval;
determining an effective expected positive exposure based on the effective expected exposure, wherein the effective expected positive exposure is an average of the effective expected exposure over the defined time interval;
determining an excess exposure based on the effective expected positive exposure;
determining a time average of the excess exposure with respect to the effective expected positive exposure;
determining a cumulative distribution of the time average of the excess exposure; and
determining a critical value with respect to a second probability of the cumulative distribution of the time average of the excess exposure, wherein the critical value with respect to the second probability is a capital buffer associated with the excess exposure of the portfolio.

17. The computer-implemented method of claim 16, wherein the expected exposure is defined as $M_s=\mathbb{E}\ [\varepsilon_t]$, $t>0$, the effective expected exposure is defined as $\hat{M}_t=\max_{s\leq t}M_s$, the effective expected positive exposure is defined as $$M^* = \frac{1}{T}\int_0^T \hat{M}_t dt,$$

$\varepsilon_t$ is an exposure profile of the portfolio determined by the data analysis model and t is a point in time within the defined time interval.

18. The computer-implemented method of claim 17, wherein the excess exposure is defined as $\varepsilon_t^+=\max(0, \varepsilon_t-M^*)$, the time average of the excess exposure is defined as $$S_T = \frac{1}{T}\int_0^T \varepsilon_t^+ dt,$$

the cumulative distribution of the time average of the excess exposure is defined as $F_s(x)=\mathbb{P}\ (S_T\leq x)$, and the critical value with respect to a second probability is defined as $s(p^*)$ where $F_s(s(p^*))=p^*$ and $p^*$ is the second probability.

19. A computer-implemented method, comprising:
validating a risk analysis model by:
generating a set of scenarios corresponding to a test set of data, the set of scenarios depending on a data analysis model selected to process the test set of data;
determining, for each scenario of the set of scenarios, a value for each point in time over a defined time interval and an exposure profile, where the exposure profile is a continuous time representation of each value determined for each point in time for a given scenario of the set of scenarios;
determining a risk envelope defining a maximum risk and a minimum risk desired at each point in time for a given scenario of the set of scenarios;
determining, for each scenario of the set of scenarios, a test statistic defining a fraction of the defined time interval that the exposure profile is outside the risk envelope;
determining a cumulative distribution of the test statistic, the cumulative distribution having a critical value corresponding to a defined probability of accuracy of the data analysis model and the test statistic; and
validating the data analysis model based on the critical value determined at least partially according to the test statistic;
modeling exposure of a profile using the validated risk analysis model;
determining a compensation for the modeled exposure; and
taking action responsive to modeling the exposure or determining the compensation.

20. The computer-implemented method of claim 19, wherein determining the compensation for the modeled exposure comprises:
determining an expected exposure based on the exposure profile;
determining an effective expected exposure based on the expected exposure;
determining an effective expected positive exposure based on the effective expected exposure;
determining an excess exposure based on the effective expected positive exposure;
determining a time average of the excess exposure with respect to the effective expected positive exposure;
determining a cumulative distribution of the time average of the excess exposure; and;
determining a critical value, with respect to a second probability, of the cumulative distribution of the time average of the excess exposure, wherein the critical value with respect to the second probability is the capital buffer.

21. The computer-implemented method of claim 19, wherein validating the data analysis model based on the critical value determined at least partially according to the test statistic comprises:
determining a second test statistic corresponding to a historical data set; and
comparing the second test statistic to the critical value, wherein the data analysis model is valid when the second test statistic is not greater than the critical value.

22. The computer-implemented method of claim 19, wherein the risk envelope is defined as a set of $\{(t,x): L(t) \leq x \leq U(t), T_0 \leq t \leq T_b\}$, where $\mathbb{P}(\varepsilon_t^{(n)} > U(t)) = \alpha$, $\mathbb{P}(\varepsilon_t^{(n)} < (t)) = \alpha$, and $$\alpha = \frac{1-p}{2},$$

wherein $L(t)$ is a boundary representing the minimum risk, $U(t)$ is a boundary representing the maximum risk, $T_0$ is a beginning of the defined time interval, $T_b$ is an end of the defined time interval, $\varepsilon_t^{(n)}$ is the exposure profile, and p is the defined probability of accuracy.

23. The computer-implemented method of claim 22, wherein the test statistic is defined as $$\tau_\varepsilon(T) = \frac{1}{T} \int_{T_0}^{T_b} \psi_\varepsilon(t) dt,$$

$T = T_b - T_0$, wherein $\psi_\varepsilon(t) = \mathbb{I}(\varepsilon_t < L(t)) + \mathbb{I}(\varepsilon_t > U(t))$, and wherein the cumulative distribution is defined as $F_\tau(x) = \mathbb{P}(\tau(\varepsilon_t) \leq x)$, $(0 < x < 1)$ and the critical value is x.

24. The computer-implemented method of claim 23, wherein the expected exposure is defined as $M_s = \mathbb{E}[\varepsilon_t]$, $t > 0$, the effective expected exposure is defined as $\hat{M}_t = \max_{s \leq t} M_s$, the effective expected positive exposure is defined as $$M^* = \frac{1}{T} \int_0^T \hat{M}_t dt,$$

$\varepsilon_t$ is an exposure profile of the portfolio determined by the data analysis model and t is a point in time within the defined time interval.

25. The computer-implemented method of claim 24, wherein the excess exposure is defined as $\varepsilon_t^+ = \max(0, \varepsilon_t - M^*)$, the time average of the excess exposure is defined as $$S_T = \frac{1}{T} \int_0^T \varepsilon_t^+ dt,$$

the cumulative distribution of the time average of the excess exposure is defined as $F_s(x) = \mathbb{P}(S_T \leq x)$, and the critical value with respect to a second probability is defined as $s(p^*)$ where $F_s(s(p^*)) = p^*$ and $p^*$ is the second probability.

* * * * *